United States Patent
Du et al.

(10) Patent No.: US 12,442,128 B2
(45) Date of Patent: Oct. 14, 2025

(54) CONTROL METHOD FOR CLOTHES DRYING DEVICE

(71) Applicants: QINGDAO HAIER WASHING MACHINE CO., LTD., Shandong (CN); Haier Smart Home Co., Ltd., Shandong (CN)

(72) Inventors: Zhaobin Du, Qingdao (CN); Lina Wang, Qingdao (CN); Longping Yao, Qingdao (CN); Yijun Song, Qingdao (CN); Hongbiao Ma, Qingdao (CN)

(73) Assignees: QINGDAO HAIER WASHING MACHINE CO., LTD., Qingdao (CN); Haier Smart Home Co., Ltd., Qingdao (CN)

(*) Notice: Subject to any disclaimer, the term of this patent is extended or adjusted under 35 U.S.C. 154(b) by 746 days.

(21) Appl. No.: 17/788,930

(22) PCT Filed: Dec. 24, 2020

(86) PCT No.: PCT/CN2020/138836
§ 371 (c)(1),
(2) Date: Jun. 24, 2022

(87) PCT Pub. No.: WO2021/129705
PCT Pub. Date: Jul. 1, 2021

(65) Prior Publication Data
US 2023/0340717 A1    Oct. 26, 2023

(30) Foreign Application Priority Data
Dec. 26, 2019   (CN) .......................... 201911366482.1

(51) Int. Cl.
*D06F 58/38*    (2020.01)
*D06F 103/04*   (2020.01)
(Continued)

(52) U.S. Cl.
CPC .......... *D06F 58/38* (2020.02); *D06F 2103/04* (2020.02); *D06F 2103/08* (2020.02); *D06F 2105/46* (2020.02); *D06F 2105/56* (2020.02)

(58) Field of Classification Search
CPC .. D06F 58/38; D06F 2103/04; D06F 2103/08; D06F 2105/46; D06F 2105/56
(Continued)

(56) References Cited

U.S. PATENT DOCUMENTS

| | | | |
|---|---|---|---|
| 5,347,727 A * | 9/1994 | Kim .......................... | D06F 58/30 34/535 |
| 2007/0186438 A1* | 8/2007 | Woerdehoff ............ | D06F 58/46 34/445 |

(Continued)

FOREIGN PATENT DOCUMENTS

| CN | 102899871 A | 1/2013 |
|---|---|---|
| CN | 104846608 A | 8/2015 |

(Continued)

OTHER PUBLICATIONS

International Search Report mailed Mar. 30, 2021, in corresponding to International Application No. PCT/CN2020/138836; 7 pages (with English Translation).

*Primary Examiner* — John P McCormack
(74) *Attorney, Agent, or Firm* — Maier & Maier, PLLC

(57) ABSTRACT

A control method for a clothes drying device includes: a load determination stage: determining the size of a load; and a drying stage: on the basis of the size of the load, selectively controlling a drying drum to rotate clockwise and counterclockwise alternately or controlling the drying stage to at least operate for a first preset time. In the embodiments, targeted control can be carried out on different loads: during the drying of a large load by controlling a drying drum to rotate clockwise and counterclockwise alternately, the load is effectively prevented from being knotted and twisted; and
(Continued)

during the drying of a small load, the phenomenon of uneven drying of mixed loads is avoided by means of prolonging the drying time.

9 Claims, 3 Drawing Sheets

(51) Int. Cl.
*D06F 103/08* (2020.01)
*D06F 105/46* (2020.01)
*D06F 105/56* (2020.01)

(58) Field of Classification Search
USPC .......................................................... 34/491
See application file for complete search history.

(56) References Cited

U.S. PATENT DOCUMENTS

| | | | |
|---|---|---|---|
| 2012/0005918 A1* | 1/2012 | Kim | D06F 58/38 |
| | | | 34/491 |
| 2017/0130389 A1* | 5/2017 | Bisaro | D06F 58/38 |
| 2021/0214883 A1* | 7/2021 | Chae | D06F 58/203 |

FOREIGN PATENT DOCUMENTS

| | | |
|---|---|---|
| CN | 106149330 A | 11/2016 |
| CN | 106480685 A | 3/2017 |
| CN | 111021019 A | 4/2020 |
| CN | 111101356 A | 5/2020 |
| JP | H1090171 A | 4/1998 |
| KR | 20090046071 A | 5/2009 |

* cited by examiner

CONTROL METHOD FOR CLOTHES DRYING DEVICE

FIELD

The present disclosure relates to the technical field of clothing treatment, and specifically relates to a method for controlling a clothing drying apparatus.

BACKGROUND

A clothing dryer is a cleaning household appliance which instantly evaporates and dries moisture in the washed clothing through electric heating, and which is particularly required in winter in the north and "damp days" in the south when it is difficult to dry the clothing.

A drying drum of existing drum clothing dryers or washing-drying integrated machines generally rotates in a single direction when drying the clothing, and this control method has a low cost and is simple in operation. However, with the improvement of the quality of life, people are having more and more requirements on the clothing dryer in terms of drying effect on the clothing. For the above low-cost apparatus, when drying a small load, the drying time is usually relatively short; however, if the load is a mixed load, such as including casual clothing, cotton shirts, etc., the casual clothing and the like with more chemical fibers are easier to dry in the drying process, while cotton shirts with a higher water content are relatively slower to dry, which is likely to cause uneven drying.

Accordingly, there is a need in the art for a new method for controlling a clothing drying apparatus to solve the above problem.

SUMMARY

In order to solve the above problem in the prior art, that is, to solve the problem in existing clothing drying apparatuses that the drying is uneven in case of drying a small load, the present disclosure provides a method for controlling a clothing drying apparatus, in which the clothing drying apparatus includes a drying drum and a heating device, a drying process of the clothing drying apparatus includes a load determining stage, a first heating stage, a second heating stage, an extra drying stage and a cold air stage that are run in sequence, and the control method includes:
determining a size of load in the load determining stage;
if the load is a small load, then judging whether the load includes a high-water-content load in the process of running the first heating stage by the clothing drying apparatus; and
controlling the first heating stage to run for at least a first preset time if the load includes a high-water-content load.

In a preferred technical solution of the above method for controlling the clothing drying apparatus, the step of "judging whether the load includes a high-water-content load" further includes:
acquiring a plurality of humidity values of the load successively; and
if a difference between one humidity value and a previous humidity value thereof in the plurality of humidity values is larger than or equal to a first humidity threshold, then determining that the load includes the high-water-content load.

In a preferred technical solution of the above method for controlling the clothing drying apparatus, the control method further includes:
if the load is a small load, then controlling the drying drum to rotate in one direction in the first heating stage and the second heating stage.

In a preferred technical solution of the above method for controlling the clothing drying apparatus, the control method further includes:
if the load is a large load, then controlling the drying drum to rotate in one direction in the first heating stage, and controlling the drying drum to rotate in forward and reverse directions alternately in the second heating stage.

In a preferred technical solution of the above method for controlling the clothing drying apparatus, the step of "determining a size of load" further includes:
controlling the drying drum to rotate in one direction and the heating device to blow cold air;
acquiring a plurality of humidity values successively within a second preset time;
calculating the number of humidity values that are larger than or equal to a second humidity threshold in the plurality of humidity values;
when the number is larger than or equal to a preset number or a ratio of the number to a total number is larger than a preset ratio, determining that the load is a large load; and
otherwise, determining that the load is a small load.

In a preferred technical solution of the above method for controlling the clothing drying apparatus, the control method further includes:
acquiring a water content of the load when the clothing drying apparatus is running the first heating stage; and
controlling the clothing drying apparatus to run the second heating stage if the water content is smaller than or equal to a first water content threshold.

In a preferred technical solution of the above method for controlling the clothing drying apparatus, the control method further includes:
acquiring a water content of the load when the clothing drying apparatus is running the second heating stage; and
controlling the clothing drying apparatus to run the extra drying stage if the water content is smaller than or equal to a second water content threshold.

In a preferred technical solution of the above method for controlling the clothing drying apparatus, the step of "controlling the clothing drying apparatus to run the extra drying stage" further includes:
calculating an extra drying time based on a running duration of the first heating stage, a running duration of the second heating stage and an extra drying coefficient; and
controlling the drying drum to rotate in one direction for the extra drying time.

In a preferred technical solution of the above method for controlling the clothing drying apparatus, the control method further includes:
controlling the clothing drying apparatus to run the cold air stage when a running time of the extra drying stage reaches the extra drying time.

In a preferred technical solution of the above method for controlling the clothing drying apparatus, the step of "controlling the clothing drying apparatus to run the cold air stage" further includes:

controlling the drying drum to rotate in one direction and the heating device to blow cold air until an air outflow temperature of the heating device is lower than a temperature threshold.

It can be understood by those skilled in the art that in the preferred technical solutions of the present disclosure, the clothing drying apparatus includes a drying drum and a heating device, a drying process of the clothing drying apparatus includes a load determining stage, a first heating stage, a second heating stage, an extra drying stage and a cold air stage that are run in sequence, and the control method includes: determining a size of load in the load determining stage; if the load is a small load, then judging whether the load includes a high-water-content load in the process of running the first heating stage by the clothing drying apparatus; and controlling the first heating stage to run for at least a first preset time if the load includes a high-water-content load.

By further judging whether there is a high-water-content load in the load when the load is a small load, and controlling the first heating stage to run for at least the first preset time if there is a high-water-content load, the control method of the present application can avoid uneven drying of a mixed load by extending the drying time, and improve the drying effect and the user experience.

Through research, the inventor has found that when drying the small load, since there is less load, the drying heat can be easily dissipated, and the drying time is usually relatively short. However, when the small load includes a load with a higher water content (such as a cotton and linen load), it is easy to cause uneven drying during the drying process, and the load with a higher water content usually cannot be completely dried. At this time, by judging whether there is a load with a higher water content in the load during the running of the first heating stage, and extending the running time of the first heating stage before entering the second drying stage if there is a load with a higher water content so that this stage runs for at least the first preset time, the load with a higher water content can have a sufficient drying time and the drying effect can be improved.

BRIEF DESCRIPTION OF DRAWINGS

The method for controlling a clothing drying apparatus of the present disclosure will be described below with reference to the accompanying drawings and in connection with a clothing dryer. In the drawings.

DETAILED DESCRIPTION

Preferred embodiments of the present disclosure will be described below with reference to the accompanying drawings. It should be understood by those skilled in the art that these embodiments are only used to explain the technical principles of the present disclosure, and are not intended to limit the scope of protection of the present disclosure. For example, although the embodiments are described in connection with a clothing dryer, this is not intended to limit the scope of protection of the present disclosure. Those skilled in the art can apply the present disclosure to other application scenes without departing from the principles of the present disclosure. For example, the present application can also be applied to a clothing drying apparatus with a rotatable drying drum, such as a washing-drying integrated machine.

Figure 1:
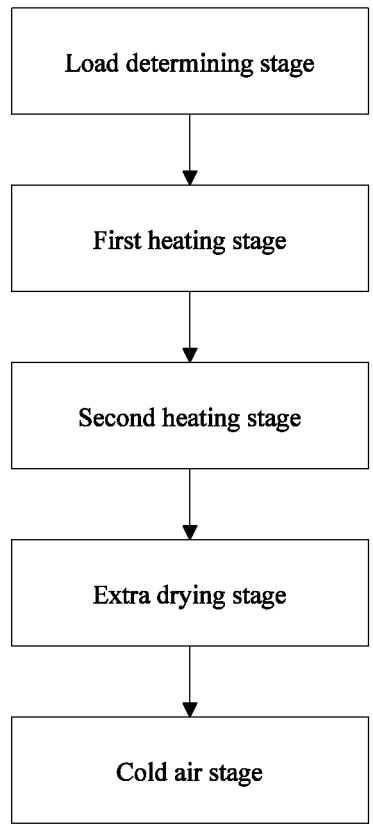
FIG. 1 is a drying process diagram of the clothing drying apparatus of the present disclosure.

First, referring to FIG. 1 and FIG. 2, the method for controlling a clothing drying apparatus of the present disclosure will be described. FIG. 1 is a drying process diagram of the clothing drying apparatus of the present disclosure, and FIG. 2 is a flowchart of the method for controlling the clothing drying apparatus of the present disclosure.

In the prior art, a clothing dryer typically includes a cabinet, as well as a drying drum and a heating device that are arranged in the cabinet. The drying drum can accommodate a load to be dried (such as clothing, bed quilts, towels, blankets, etc.), and drive the load to continuously turn over inside the drying drum through its own rotation. The heating device can provide a hot airflow into the drying drum, and the flow of the hot airflow can evaporate and dissipate the water in the load. Through a joint action of the drying drum and the heating device, drying of the load is finally realized. However, the existing control methods for the clothing dryer are simple; when drying a large load, the load may easily get knotted and entangled, and when drying a small load, if the load includes a load with a higher water content, it is easy to cause uneven drying. That is, it is impossible for the existing clothing drying apparatuses to perform a targeted control based on the size of the load, resulting in poor user experience in use.

As shown in FIG. 1, in order to solve the problem in existing clothing drying apparatuses that the drying is uneven when drying a small load, the drying process of the clothing dryer of the present application mainly includes the following five stages: a load determining stage, a first heating stage, a second heating stage, an extra drying stage and a cold air stage, and the five stages are run in sequence. When the clothing dryer runs the load determining stage and the cold air stage, the heating device blows cold air, and when the clothing dryer runs the remaining first heating stage, second heating stage and extra drying stage, the heating device blows hot air. When the heating device is turned on, parameters thereof such as the specific heating power and air outflow temperature are not described in detail in the present application, and those skilled in the art can select them based on the model, running mode, clothing type and the like of the specific clothing dryer. Specific values of the above parameters do not constitute limitations to the present application.

Figure 2:
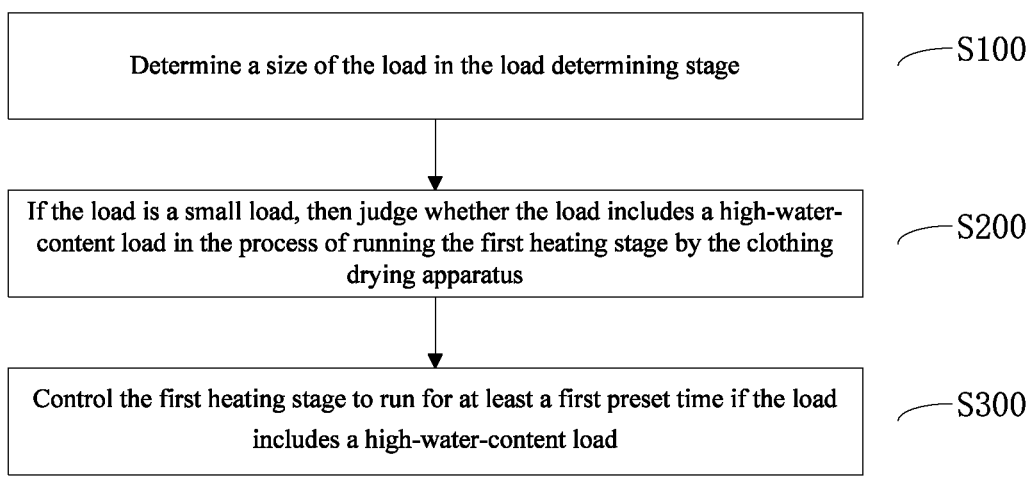
FIG. 2 is a flowchart of the method for controlling the clothing drying apparatus of the present disclosure.

As shown in FIG. 2, the method for controlling the clothing dryer of the present application mainly includes the following steps S100 to S300.

S100: determining a size of load in the load determining stage. For example, in this step, the drying drum can be controlled to rotate in one direction, and the heating device can be controlled to blow cold air. By providing a humidity sensor (such as a resistive humidity sensor or a capacitive humidity sensor) in the clothing dryer to detect a length of contact time between the load and the humidity sensor, the size of the load is determined; or by collecting a magnitude of the current of the driving motor, a change rate of the current of the driving motor and the like when the drying drum is rotating, the size of the load is determined.

S200: if the load is a small load, then judging whether the load includes a high-water-content load in the process of running the first heating stage by the clothing drying apparatus. For example, in this step, after the size of the load is determined, it is necessary to perform different drying controls for different sizes of the load. When the load is a small load, it is necessary to further determine whether there is a load with a higher water content in the load, so as to determine whether the heating time needs to be extended in the first heating stage.

S300: controlling the first heating stage to run for at least a first preset time if the load includes a high-water-content load. In this step, when the load includes a high-water-content load, by extending the drying time, the high-water-content load can be fully dried. For example, the heating device is controlled to blow hot air, the drying drum is controlled to rotate in one direction, and the drying stage is controlled to run for at least the first preset time, such as at least 30 minutes.

As can be seen from the above description, by further judging whether there is a high-water-content load in the load when the load is a small load, and controlling the first heating stage to run for at least the first preset time if there is a high-water-content load, the control method of the present application can avoid uneven drying of a mixed load by extending the drying time, and improve the drying effect and the user experience.

A preferred embodiment of the present application will be described below with reference to FIG. 3, which is a logic diagram of the method for controlling the clothing drying apparatus in a possible embodiment of the present disclosure.

Figure 3:
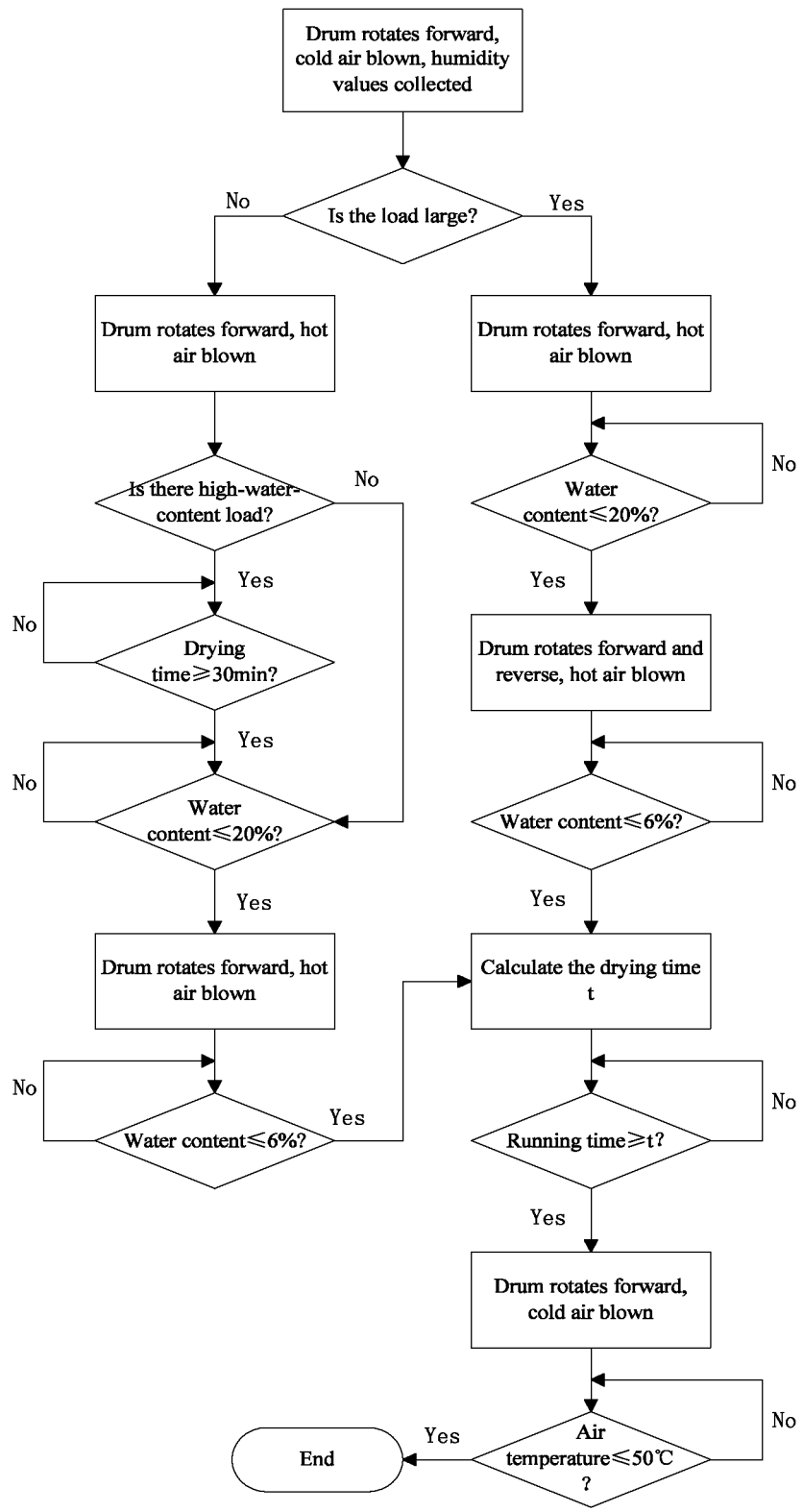
FIG. 3 is a logic diagram of the method for controlling the clothing drying apparatus in a possible embodiment of the present disclosure.

As shown in FIG. 3, in a preferred embodiment, the process of determining the size of the load may be: controlling the drying drum to rotate in a forward direction and the heating device to blow cold air; acquiring a plurality of humidity values successively within a second preset time; calculating the number of humidity values that are larger than or equal to a second humidity threshold in the plurality of humidity values; when the number is larger than or equal to a preset number or a ratio of the number to a total number is larger than a preset ratio, determining that the load is a large load; and otherwise, determining that the load is a small load. The successive acquisition may be continuous acquisition, or may be acquisition at a certain interval. This is also the same in the following.

For example, a resistive humidity sensor is provided at a throw-in port of the drying drum, and the sensor has a pair of metal strip electrodes. When the load contacts the two electrodes at the same time during the rotation of the drying drum, a resistance value between the two electrodes can be detected. Different water contents of the load leads to different resistance values, but the water content is approximately proportional to the resistance value. For the load of the same component, the resistance value increases as the water content of the load decreases. Therefore, the magnitude of the water content of the load can be judged through the size of the resistance value. Similarly, the resistance value can also be used to judge the size of the humidity value of the load.

When the drying drum rotates in the forward direction, both the load and the air are in contact with the two metal electrodes, and the resistance value between the load and the electrodes as well as the resistance value between the air and the electrodes are measured respectively through the conduction of the two metal strips. When the load is large, the area is relatively large, and the frequency of its contact with the metal strip electrodes is high, that is, the metal strip electrodes contact with the load more frequently, and the metal strip electrodes contact with the air less frequently. Therefore, the larger the number of times the resistance values (the humidity values) generated by the contact of the metal electrodes with the load are measured within a unit time, the larger the number of times the resistance values (the humidity values) exceed the resistance threshold (the second humidity threshold). When the load is small, the area of the load is relatively small, and the frequency of its contact with the metal strips is low, that is, the metal strip electrodes contact with the load less frequently, and the metal strip electrodes contact with the air more frequently. Therefore, the smaller the number of times the resistance values (the humidity values) generated by the contact of the metal electrodes with the load are measured within a unit time, the smaller the number of times the resistance values (the humidity values) exceed the resistance threshold (the second humidity threshold). At this time, by calculating the number of humidity values larger than or equal to the second humidity threshold in the plurality of humidity values collected within the second preset time, and comparing the number with the preset number or through a ratio of the number to the total number, the size of the load can be determined.

For example, the resistance value is collected every 0.4 s within 2 minutes, and a total of 300 resistance values are collected. Through comparison and statistics, out of the 300 resistance values, the number of resistance values larger than the resistance threshold is 240, which is larger than the preset number of 200. Therefore, the current load is determined as a large load. The way of determining the size of load through the ratio is similar to the above, and will not be described repeatedly herein. The second preset time, the interval, the preset number, etc., are all exemplary, and can be adjusted by those skilled in the art.

With continued reference to FIG. 3, as a preferred embodiment, judging whether the load includes a high-water-content load can be conducted in the following manner acquiring a plurality of humidity values of the load successively; and if a difference between one humidity value and a previous humidity value thereof in the plurality of humidity values is larger than or equal to a first humidity threshold, then determining that the load includes a high-water-content load. Specifically, the inventor has found through experiments that during the running of the first heating stage, the humidity and water content of the load both decrease as the time elapses; however, since the clothing of a different material has a different water content, the decreasing speed thereof also differs greatly; especially when there is a load with a higher water content (that is, a high-water-content load) in the mixed load, the humidity values successively collected by the humidity sensor do not form a continuously descending curve. Instead, when the high-water-content load touches the humidity sensor, there will be a reverse sudden change in the humidity value, or the humidity curve will have an electrocardiogram-like jump in the descending stage. At this time, by acquiring the humidity values of the load (that is, the above-mentioned humidity values larger than the second humidity threshold) continuously or at a certain interval, and judging whether the plurality of humidity values meet the above characteristic, that is, whether there is a difference between one humidity value and a previous humidity value thereof that is larger than or equal to the first humidity threshold, it can be determined whether the load includes a high-water-content load.

Figure 4:
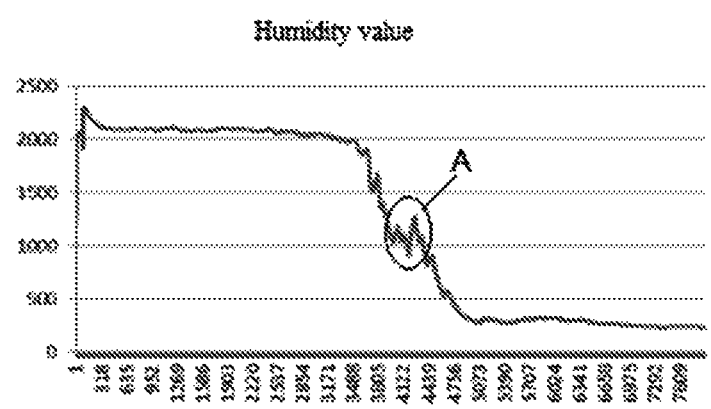
FIG. 4 is a curve of load humidity in a drying process in a possible embodiment of the present disclosure.

The above judgment process will be described below with reference to FIG. 4, which is a curve of load humidity in the drying process in a possible embodiment of the present disclosure. As shown in FIG. 4, the abscissa is the drying time, and the ordinate is the collected humidity value. At part A in FIG. 4, the humidity value has an obvious reverse jump during the descending process, and at the jump position, a difference between one humidity value and a previous humidity value thereof is larger than 300, so it can be determined that the load includes a high-water-content load. Of course, the above-mentioned first humidity threshold of 300 is only exemplary, and can be adjusted by those skilled in the art.

Since the drying time is relatively short in the drying process of the small load, once the small load includes a high-water-content load, it is easy to cause uneven drying. Therefore, when it is determined that the load is a small load, it is necessary to further judge whether the load includes a high-water-content load when running the first heating stage; if the load includes a high-water-content load, the first heating stage is controlled to run for at least the first preset time to ensure that the high-water-content load is fully dried, and then it is determined whether to enter the next stage based on the water content of the load.

For example, when the load is a small load and the load includes a high-water-content load, the drying drum can be controlled to rotate in the forward direction, and the first heating stage can be controlled to run for at least the first preset time, such as at least 30 minutes, etc. The first preset time is not limiting, and can be adjusted based on the specific model of the clothing dryer. For example, the first preset time can also be any value in a range of 20-40 minutes.

With continued reference to FIG. 3, in a preferred embodiment, the different stages of the first heating stage, the second heating stage and the extra drying stage are switched based on the water content of the load.

The applicant has found through experiments that when drying the large load, it is not that the large load will be easy to get entangled in the entire drying process, but the entanglement phenomenon is more obvious when the load has a water content in a specific range of 20%-6%. Therefore, in the present application, 20% and 6% can be used as segmentation standards of the three stages. When the water content of the load is smaller than or equal to 20% during the running of the first heating stage, the second heating stage will be entered and run. Similarly, during the running of the second heating stage, when the water content of the load is smaller than or equal to 6%, the extra drying stage will be entered and run. During the running of the first heating stage and the second heating stage, the water content can be detected by the above resistive humidity sensor; of course, a humidity sensor specially configured to detect the water content of the load can also be additionally provided in the clothing dryer for detection. Furthermore, the above 20% and 6% are not limiting, those skilled in the art can adjust these values based on the principle of the present application, and such adjustments do not deviate from the scope of protection of the present application.

With continued reference to FIG. 3, in a preferred embodiment, the control method further includes: if the load is a large load, then controlling the drying drum to rotate in one direction in the first heating stage, and controlling the drying drum to rotate in forward and reverse directions alternately in the second heating stage.

Specifically, since the large load is easier to get entangled when the water content is in the range of 20%-6% in the drying process, when it is determined that the load is a large load, the drying drum is controlled to rotate in the forward direction in the first heating stage and rotate in forward and reverse directions alternately in the second heating stage, so as to prevent the load from being entangled.

Referring to FIG. 3, no matter the load is a large load or a small load, when running the second heating stage, the water content of the load is acquired, and when the water content is smaller than or equal to 6%, the extra drying stage is entered. Specifically, after entering the extra drying stage, the extra drying time is first determined based on the running duration of the first heating stage, the running duration of the second heating stage and an extra drying coefficient, and the drying drum is controlled to rotate in one direction for the extra drying time.

The running durations of the first heating stage and the second heating stage can be recorded from when the first heating stage and the second heating stage start to run, and stored respectively when the two stages end. The extra drying time can be calculated in the following way: first, the extra drying coefficient is determined based on the load type, in which the determination of the load type can be conducted in the first heating stage or the second heating stage, and the determination method is similar to the above method of judging whether the load includes a high-water-content load; by acquiring the humidity value or water content of the load during the running of the heating stages, analyzing the change of the humidity value or water content, such as calculating the humidity change rate, calculating the difference between the humidities, etc., and comparing them with experimentally determined standard thresholds for different types of load, the current load type is determined. After the load type is determined, the magnitude of the extra drying coefficient can be further determined based on a correspondence between the load type and the extra drying coefficient. The correspondence between the load type and the extra drying coefficient can be determined through experiments. For example, the cotton and linen load has a larger extra drying coefficient, and the fiber load has a smaller extra drying coefficient, etc. Of course, the way of determining the extra drying coefficient is not unique, and those skilled in the art can also use other possible ways, such as determining based on the drying mode selected by the user before the drying starts, the type of the clothing to be dried, etc.; or the extra drying coefficient can be set in advance based on the size of the load, etc.

After the above parameters are determined, the extra drying time can be calculated according to the following formula (1):

$$t=(T_1+T_2)/\mu \qquad (1).$$

In formula (1), t represents the extra drying time, $T_1$ represents the running duration of the first heating stage, $T_2$ represents the running duration of the second heating stage, and $\mu$ represents the extra drying coefficient.

After the extra drying time is determined, the drying drum can be controlled to rotate in the forward direction for the extra drying time.

With continued reference to FIG. 3, when the running duration of the extra drying stage reaches the extra drying time, the cold air stage is run. Specifically, the drying drum is controlled to rotate in one direction and the heating device is controlled to blow cold air until an air outflow temperature of the heating device is lower than a temperature threshold. Since the load is in a high temperature state after the extra drying stage ends, the load needs to be cooled to prevent the user from being scalded when taking the load. For example, the drying drum can be controlled to continue to rotate in the forward direction, and the heating device can be controlled to blow cold air instead, so as to cool the load. During the cooling process, the air outflow temperature of the heating device is collected in real time, and when the air outflow temperature is lower than 50° C., the clothing dryer is controlled to shut down and the drying process ends. The temperature threshold is not limited to 50° C., and it may also be any value between 30° C. and 50° C.

The advantage of the above embodiment is that the drying process is further subdivided by using the first water content threshold and the second water content threshold, and in case of a large load, only in the second heating stage will the drying drum be controlled to rotate in forward and reverse directions alternately. As compared with controlling the drying drum to rotate in forward and reverse directions in the entire drying process, the control method of the present disclosure can not only prevent the large load from getting knotted and entangled during the drying process, but also can shorten the drying time and improve the user experience.

When the load is a small load, it is judged whether the load includes a load with a higher water content during the running of the first heating stage; if there is a load with a higher water content, then before entering the second drying stage, the running duration of the first heating stage is extended, so that this stage runs for at least the first preset time, thus enabling the load with a higher water content to have a sufficient drying time, improving the drying effect, and avoiding uneven drying.

That is, by dividing the drying stage into a first heating stage and a second heating stage, when the load is a large load, the drying drum is controlled to rotate in forward and reverse directions alternately in the second heating stage, and when the load is a small load, the running duration of the first heating stage is selectively extended, so that the present application overcomes the defect that the prior art cannot perform a targeted control based on the size of the load, thus improving the drying effect and the user experience.

In addition, by setting different extra drying coefficients for different types of load, and calculating the extra drying time based on the extra drying coefficient, the running duration of the first heating stage and the running duration of the second heating stage jointly, the present application fully takes into account the difference between the drying durations required for different loads, can dynamically control the extra drying duration, avoid the phenomenon of incomplete drying of the clothing, and ensure that different loads have substantially the same drying effect.

A control process of the clothing dryer in a possible embodiment will be described below in connection with FIG. 3.

As shown in FIG. 3, in a possible embodiment, after the clothing dryer is started and run, first, the drying drum is controlled to rotate in the forward rotation and the heating device is controlled to blow cold air; a humidity value is collected every 0.4 s within 2 minutes, and a total of 300 humidity values are collected→through judgment, the number of humidity values corresponding to the load in the 300 humidity values is 240, which exceeds the threshold of 200, so the load is determined as a large load→after the load type is determined, timing is started, the drying drum is controlled to continue to rotate in the forward direction, and the heating device is controlled to blow hot air to dry the load→during the drying process, the humidity value of the load is collected at intervals; on one hand, the type of the load is judged based on the change of the humidity value, and on the other hand, it is judged whether the water content of the load is smaller than or equal to 20%→when the water content of the load is smaller than or equal to 20%, the running duration of the first heating stage is recorded, and timing is restarted; the drying drum is controlled to rotate in forward and reverse directions alternately, the heating device is controlled to continue to blow hot air, and an anti-entanglement treatment is performed on the load→during the drying process, the water content of the load is still collected at intervals to judge whether the water content of the load is smaller than or equal to 6%→when the water content of the load is smaller than or equal to 6%, the running duration of the second heating stage is recorded, and formula (1) is used to calculate the extra drying time $t_1$; the drying drum is controlled to rotate in the forward direction, the heating device is controlled to blow hot air, and the extra drying treatment is performed on the load→when the running time of the extra drying treatment reaches the time $t_1$, the drying drum is controlled to continue to rotate in the forward direction, the heating device is controlled to blow cold air, and the load is cooled→when the air outflow temperature of the heating device is lower than or equal to 50° C., the drying drum is controlled to stop rotating, the heating device is controlled to shut down, and the drying process ends.

Still referring to FIG. 3, in another possible embodiment, after the clothing dryer is started and run, first, the drying drum is controlled to rotate in the forward rotation and the heating device is controlled to blow cold air; a humidity value is collected every 0.4 s within 2 minutes, and a total of 300 humidity values are collected→through judgment, the number of humidity values corresponding to the load in the 300 humidity values is 120, which is smaller than the threshold of 200, so the load is determined as a small load→after the load type is determined, timing is started, the drying drum is controlled to continue to rotate in the forward direction, and the heating device is controlled to blow hot air to dry the load→during the drying process, the humidity value of the load is collected at intervals, and based on the change of the humidity value, it is judged whether the load includes a high-water-content load→after comparison, the difference between one humidity value and a previous humidity value thereof in the collected humidity values is 350, which is larger than the threshold of 300, so it is determined that the load includes a high-water-content load; at this time, the drying drum and the heating device are controlled to maintain the current running state until the running time of the current stage reaches 30 minutes→after the 30 minutes is reached, the humidity value of the load is collected at intervals and it is judged whether the water content of the load is smaller than or equal to 20%→when the water content of the load is smaller than or equal to 20%, the running duration of the first heating stage is recorded, and timing is restarted; the drying drum is controlled to continue to rotate in the forward direction, and the heating device is controlled to continue to blow hot air→during the drying process, the water content of the load is still collected at intervals to judge whether the water content of the load is smaller than or equal to 6%→when the water content of the load is smaller than or equal to 6%, the running duration of the second heating stage is recorded, and formula (1) is used to calculate the extra drying time $t_2$; the drying drum is controlled to continue to rotate in the forward direction, the heating device is controlled to blow hot air, and the extra drying treatment is performed on the load→when the running time of the extra drying treatment reaches the time $t_2$, the drying drum is controlled to continue to rotate in the forward direction, the heating device is controlled to blow cold air, and the load is cooled→when the air outflow temperature of the heating device is lower than or equal to 50° C., the drying drum is controlled to stop rotating, the heating device is controlled to shut down, and the drying process ends.

It should be explained that although the forward and reverse directions of the drying drum are not specifically defined in each embodiment of the present application, this is not unclear; on the contrary, those skilled in the art can set any rotational direction of the drying drum as the forward direction thereof, and this setting will not affect the execution of the control method of the present application. For example, those skilled in the art can set a clockwise rotation of the drying drum as its forward direction, and a counter-clockwise rotation as its reverse direction, etc.

It can be understood by those skilled in the art that the above clothing dryer also includes some other well-known structures, such as a processor, a controller, a memory, etc. The memory includes but is not limited to a random-access memory, a flash memory, a read-only memory, a programmable read-only memory, a volatile memory, a non-volatile memory, a serial memory, a parallel memory or a register, etc.; and the processor includes but is not limited to a CPLD/FPGA, a DSP, an ARM processor, a MIPS processor, etc. These well-known structures are not shown in the drawings in order not to unnecessarily obscure the embodiments of the present disclosure. The controller may physically be a controller specially configured to execute the method of the present disclosure, or may be a functional module or functional unit of a general controller.

It should be noted that although the detailed steps of the method of the present disclosure have been described above in detail, those skilled in the art can combine and split the above steps and exchange an order thereof without departing from the basic principles of the present disclosure. The thus-modified technical solutions do not change the basic concept of the present disclosure, and therefore also fall within the scope of protection of the present disclosure.

Hitherto, the technical solutions of the present disclosure have been described in connection with the preferred embodiments shown in the accompanying drawings, but it is easily understood by those skilled in the art that the scope of protection of the present disclosure is obviously not limited to these specific embodiments. Without departing from the principles of the present disclosure, those skilled in the art can make equivalent changes or replacements to relevant technical features. All these technical solutions after such changes or replacements will fall within the scope of protection of the present disclosure.

What is claimed is:

1. A method for controlling a clothing drying apparatus, the clothing drying apparatus comprising a drying drum and a heating device, wherein a drying process of the clothing drying apparatus comprises a load determining stage, a first heating stage, a second heating stage, an extra drying stage and a cold air stage that are run in sequence, and the control method comprises:
    determining a size of load in the load determining stage;
    when the load is a small load, judging whether the load comprises a high-water-content load in the process of running the first heating stage by the clothing drying apparatus; and
controlling the first heating stage to run for at least a first preset time if the load comprises a high-water-content load;
    wherein the step of judging whether the load comprises a high-water-content load further comprises:
    acquiring a plurality of humidity values of the load successively; and
    if a difference between one humidity value and a previous humidity value thereof in the plurality of humidity values is larger than or equal to a first humidity threshold, then determining that the load comprises the high-water-content load.

2. The method for controlling the clothing drying apparatus according to claim 1, further comprising:
    if the load is a small load, then controlling the drying drum to rotate in one direction in the first heating stage and the second heating stage.

3. The method for controlling the clothing drying apparatus according to claim 1, further comprising:
    when the load is a large load, controlling the drying drum to rotate in one direction in the first heating stage, and controlling the drying drum to rotate in forward and reverse directions alternately in the second heating stage.

4. The method for controlling the clothing drying apparatus according to claim 1, wherein the step of determining a size of load further comprises:
    controlling the drying drum to rotate in one direction and the heating device to blow cold air;
    acquiring a plurality of humidity values successively within a second preset time;
    calculating the number of humidity values that are larger than or equal to a second humidity threshold in the plurality of humidity values;
    when the number is larger than or equal to a preset number or a ratio of the number to a total number is larger than a preset ratio, determining that the load is a large load; and
    otherwise, determining that the load is a small load.

5. The method for controlling the clothing drying apparatus according to claim 1, further comprising:
    acquiring a water content of the load when the clothing drying apparatus is running the first heating stage; and
    controlling the clothing drying apparatus to run the second heating stage if the water content is smaller than or equal to a first water content threshold.

6. The method for controlling the clothing drying apparatus according to claim 1, further comprising:
    acquiring a water content of the load when the clothing drying apparatus is running the second heating stage; and
    controlling the clothing drying apparatus to run the extra drying stage if the water content is smaller than or equal to a second water content threshold.

7. The method for controlling the clothing drying apparatus according to claim 6, wherein the step of controlling the clothing drying apparatus to run the extra drying stage further comprises:
    calculating an extra drying time based on a running duration of the first heating stage, a running duration of the second heating stage and an extra drying coefficient; and
    controlling the drying drum to rotate in one direction for the extra drying time.

8. The method for controlling the clothing drying apparatus according to claim 7, further comprising:
    controlling the clothing drying apparatus to run the cold air stage when a running time of the extra drying stage reaches the extra drying time.

9. The method for controlling the clothing drying apparatus according to claim 8, wherein the step of controlling the clothing drying apparatus to run the cold air stage further comprises:

controlling the drying drum to rotate in one direction and the heating device to blow cold air until an air outflow temperature of the heating device is lower than a temperature threshold.

\* \* \* \* \*